(12) United States Patent
Friessnegg et al.

(10) Patent No.: US 7,253,906 B2
(45) Date of Patent: Aug. 7, 2007

(54) POLARIZATION STATE FREQUENCY MULTIPLEXING

(75) Inventors: Thomas Friessnegg, Ottawa (CA); Yi Liang, Ottawa (CA); John C. Martinho, Ottawa (CA)

(73) Assignee: JDS Uniphase Inc., Ottawa, Ontario (CA)

( * ) Notice: Subject to any disclaimer, the term of this patent is extended or adjusted under 35 U.S.C. 154(b) by 752 days.

(21) Appl. No.: 10/600,925

(22) Filed: Jun. 23, 2003

(65) Prior Publication Data

US 2004/0004768 A1   Jan. 8, 2004

Related U.S. Application Data

(60) Provisional application No. 60/390,362, filed on Jun. 24, 2002.

(51) Int. Cl.
*G01B 9/02* (2006.01)
(52) U.S. Cl. .................... 356/477; 356/73.1
(58) Field of Classification Search ........ 356/73.1, 356/491, 477, 481, 517; 250/227.19, 227.27; 385/12
See application file for complete search history.

(56) References Cited

U.S. PATENT DOCUMENTS 6,043,887 A    3/2000  Allard et al. ............... 356/364
6,606,158 B2*  8/2003  Rosenfeldt et al. ......... 356/477

FOREIGN PATENT DOCUMENTS

EP    1 113 250 A1    7/2001
EP    1 191 320 A1    3/2002
EP    1 207 377 A2    5/2002

OTHER PUBLICATIONS

Gregory D. VanWiggerren et al., "Single-Scan Polarization-Resolved Heterodyne Optical Network Analyzer", Technical Digest, OFC 2002, Optical Fiber Communication Conference and Exhibit, Mar. 17-22, 2002, pp. 253-254.
P.A. Williams, "Modulation Phase-Shift Measurement of PMD Using Only Four Launched Polarisation States: A New Algorithm", Electronics Letters, Sep. 2, 1999, vol. 35, No. 18.

* cited by examiner

*Primary Examiner*—Hwa (Andrew) Lee
(74) *Attorney, Agent, or Firm*—Teitelbaum & MacLean; Neil Teitelbaum; Doug MacLean

(57) ABSTRACT

A method for the rapid measurement of polarization dependent properties of an optical device under test uses a novel technique to generate light in four different polarization states in which each state is individually sensed at a different interference frequency.

The device for executing this method includes a Mach-Zehnder interferometer (M-Z) having a reference arm and a signal arm. In the signal arm, a device called a "polarization state frequency multiplexer" (PSFM) splits the light into four ports, transforms each part into one of four predetermined polarization states and then combines the light in the different polarization states together. The combined light is then passed through the device under test and combined/interfered with the light propagating through the reference arm at the output of the M-Z interferometer. Since the optical frequency of the input light to the M-Z interferometer is scanned through a range of wavelengths at a fixed repetition rate, the output light intensity (reference pattern) from the interferometer is modulated. By analyzing the M-Z interferometer output in the frequency domain, the signal levels of each polarization state can be identified and measured.

12 Claims, 2 Drawing Sheets ered (G. D. Van Wiggeren et al., OFC 2002 Technical

POLARIZATION STATE FREQUENCY MULTIPLEXING

RELATED APPLICATIONS

This application claims priority from U.S. Provisional Application No. 60/390,362 filed Jun. 24, 2002.

TECHNICAL FIELD

This invention relates to optical communications, and particularly to a method and apparatus for multiplexing light beams in different polarization states and to methods and an apparatus of using light beams so multiplexed for measuring certain optical properties.

BACKGROUND ART

Polarization measurements such as Polarization Mode Dispersion (PMD)/Differential Group Delay (DGD) and Polarization Dependent Loss (PDL) play a critical role in the design of current high-speed optical communication systems. These parameters are usually determined by algorithms that require a set of measurements for a number of polarization states. In general, it is desired to measure both DGD and PDL as a function of wavelength since the parameters typically vary with wavelength for an optical device.

In conventional measurement systems, a separate scan for each polarization state across the wavelength region of interest is required. Furthermore, averaging of multiple scans for each state may be necessary to achieve the desired signal-to-noise ratio in the measurement. This can yield relatively long measurement times during which the device must not be disturbed. In addition, long measurement times can limit the manufacturing throughput.

There are known several methods to determine the PDL and PMD/DGD of an optical device. The most important techniques are based on applying a set of well-known polarization states to the device under test (DUT) and measuring the transfer function (amplitude and phase of the signal as a function of optical wavelength) at the receiver for each of these states. In the so-called Mueller method (C. Hentschel and D. Derrickson in Fiber Optic Test and Measurement, ed: D. Derrickson, Prentice Hall, pp.356+, 1998), the PDL of the DUT can be calculated from the measured optical power transmission at linear horizontal (0°), linear diagonal (45°), linear vertical (90°) and right-hand circular polarization states only. Similarly, in the method developed by Williams (P. A. Williams, Electronic Letters, 36, 1578 (1999), the DGD of the DUT is derived from phase delay measurements at these four states only. Generally, a separate measurement is performed for each of the four polarization states.

Related solutions are disclosed in European publications EP 1191320A1 and EP 1207377A2.

A method allowing the determination of polarization dependent parameters in an interferometric approach by measuring only two orthogonal polarization states in two detectors simultaneously, has recently been proposed in European patent EP 1113250 and in a paper by Van Wiggeren (G. D. Van Wiggeren et al., OFC 2002 Technical Digest pp. 253). The invoked algorithm is based on the assumption that the DGD of the DUT is, to the first approximation, independent of wavelength.

One of the objects of the invention is to provide an apparatus and algorithm that allow the determination of both parameters, DGD and PDL, in a single wavelength sweep using a single detector without this approximation.

SUMMARY OF THE INVENTION

The invention provides a measurement scheme and apparatus for allowing rapid determination of polarization dependent parameters such as PDL and DGD in a single wavelength sweep.

In accordance with one aspect of the invention, there is provided an optical multiplexing apparatus comprising:

a tunable light source for providing a light beam, the beam having a wavelength that varies periodically through a range of wavelengths at a sweep frequency rate, a first splitting means for splitting the polarized light beam into a signal beam and a reference beam, a second splitting means for splitting the signal beam into N sub-beams;

means for imparting a different time delay to each of the N sub-beams means for imparting a distinctly different polarization state to each of the sub-beams, means for recombining the sub-beams with different polarization states into one optical beam.

means for interfering the one optical beam with the reference beam in order to obtain an optical output light signal whose amplitude is varying in time, and means for detecting the output light signal and resolving it into its frequency components wherein the time delay for each of the N sub-beams is selected such that a unique frequency component of the output light signal is associated with each one of N different polarization states.

The light beam provided by the tunable light source can be unpolarized or polarized. If the beam is polarized, the polarization state in the reference arm should be non-orthogonal to any of the states generated in the signal arm. In an embodiment of the invention, N is four and the different polarization states are linear horizontal, linear diagonal, linear vertical and right-hand circular, but other combinations can be used.

In accordance with another aspect of the invention, there is provided a method of producing a multiplexed light beam having a number of distinct polarization states, the method comprising the following steps, not necessarily in the listed order:

a) splitting an input light beam into N sub-beams, b) imparting a different time delay to each of the N sub-beams, c) imparting a different polarization state to each of the N sub-beams, and d) recombining the N sub-beams into a single combined light beam containing the supersposition of the N polarization states.

In accordance with another aspect of the invention, there is provided a method for measuring optical properties of an optical device, the method comprising the steps of:

providing a light beam of varying frequency from a frequency-tunable light source, splitting the light beam into a first light beam and a reference light beam, splitting the first light beam into N sub-beams, imparting a different time delay to each of the N-sub-beams, imparting a different polarization state to each of the N sub-beams, recombining the N sub-beams into a single combined light beam containing the supersposition of the N polarization states, passing the single combined light beam through a device under test to produce a transmitted light beam, imparting a path length difference between the single combined light beam and the reference light beam, combining the transmitted light beam and the reference light beam to cause interference therebetween and to produce an output beam, and analyzing the output beam in the frequency domain to detect optical properties of the device under test.

In accordance with yet another aspect of the invention, there is provided an apparatus for measuring optical properties of an optical device, the apparatus comprising a frequency-tunable light source, a beam splitter coupled to receive a light beam from the source and to split the light beam into a signal beam and a reference beam, an interferometer having at least a first and a second optical paths having different path length, coupled to pass the signal beam through the first path and the reference beam through the second path, a second beam splitter disposed in the first path to split the signal beam into N sub-beams;

means for imparting a different time delay to each of the N sub-beams, means for imparting a distinctly different polarization state to each of the sub-beams, means for recombining the sub-beams with different polarization states into one recombined optical beam for interference with the reference beam in the interferometer to form an interfered beam, and means for analyzing the interfered beam in the frequency domain.

The recombined optical beam serves to be passed through the device being tested (DUT) before the interference of the recombined beam with the reference beam. In principle, the reference beam can also be passed through the DUT.

BRIEF DESCRIPTION OF THE DRAWINGS

The invention will be explained in more detail below in association with drawings illustrating exemplary, non-limiting embodiments of the invention, and in which.

DETAILED DESCRIPTION OF THE EMBODIMENTS OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention will be explained in its basic form as well as by its use in the measurement of PDL and DGD (the four-state approach) by making use of the algorithms established by Mueller and Williams, respectively. The general concept of "polarization state frequency multiplexing" proposed here can be extended to any application where it is beneficial to measure the characteristics of a device for multiple polarization states as a function of optical wavelength (frequency) simultaneously.

Figure 1:
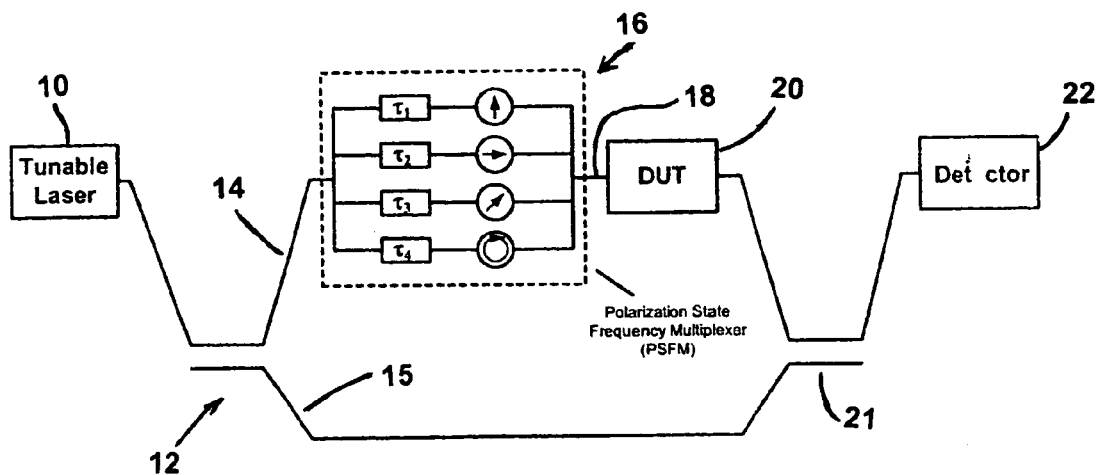
FIG. 1 is a schematic representation of an apparatus of the invention, for measuring certain optical properties of an optical device using a Mach Zehnder interferometer.

FIG. 1 depicts the basic schematic of the apparatus used to perform the measurement. Light beam from a tunable laser source 10 is launched into an interferometer 12 having a signal arm 14 and a reference arm 15. The light from the source 10 is normally linear polarized, but light having another polarization state is within the scope of this present. While a Mach-Zehnder interferometer is used for the sake of the specific embodiment, the invention is not limited to this type of interferometer. Any interferometer that provides two independent paths for the signal and the reference beam and provides a single pass of the beam through the DUT and PSFM can be employed. For example, Tyman Green, Michelson or Fabry-Perot interferometers can be used.

The laser light beam is split into a signal beam and a reference beam in the respective arms. The signal beam in the signal arm 14 is guided to a device referred to herein as a polarization state frequency multiplexer (PSFM) 16. This embodiment of the invention is illustrated in terms of light propagating in waveguides. The invention can also be implemented using bulk optical components and free space propagation. In the PSFM, the beam is split into four separate beams each of which being delayed by predetermined delays $\tau_1, \tau_2, \tau_3$, and $\tau_4$ (e.g. by using different waveguide lengths $L_1, L_2, L_3$, and $L_4$). In each of the delayed optical beams, light beams having polarization states of linear horizontal (0°), linear diagonal (45°), linear vertical (90°) and right-hand circular (dextro-circular), respectively, are formed from the laser light by means of polarizing optics such as polarizers and/or waveplates appropriately aligned with respect to the polarization state of the laser light beam. Thus, each of the four polarization states is associated with a predetermined optical delay. The four signal beams are then re-combined into a single signal beam 18, guided to the output of the PSFM and launched into a DUT 20. Because the light in all the four polarization states passes through the DUT simultaneously, the present invention has the advantage of reducing the time for making measurements of PDL and PMD/DGD as a function of wavelength.

The light from the output of the DUT is re-combined, at the splitter/combiner 21, with the light in the reference arm 15 of the Mach Zehnder (M-Z) interferometer 12 and interference occurs. The interfered light beam output from the M-Z interferometer is then optically coupled to a photodetector 22 to produce an electrical output signal.

Since the frequency (or wavelength) of the light emitted by the tunable-frequency light source (e.g. a tunable laser) and directed to the M-Z interferometer is varied periodically through a range of wavelengths at a fixed repetition rate, the output light intensity (interference pattern) from the interferometer is modulated and there is a corresponding variation in the amplitude of output signal from the photodetector. The rate of change of the output signal or its modulation frequency will depend on the optical path of light through the signal arm of the interferometer. For a particular optical path, as the wavelength of the source is scanned, the signal intensity at the output of Mach Zehnder interferometer is modulated at a fixed frequency known as the beat frequency. Since there are several different optical paths through the Mach Zehnder interferometer, the output signal from the photodetector contains modulations at several different beat frequencies. Because each polarization state is associated with a different optical delay or path length in the PSFM, a particular polarization state can be identified by its associated beat frequency Thus, by analyzing the interferometer output in the frequency domain, the signal levels for each of the polarization states can be identified and measured, even though light in all four polarization states is passed through the DUT at the same time.

Figure 3:
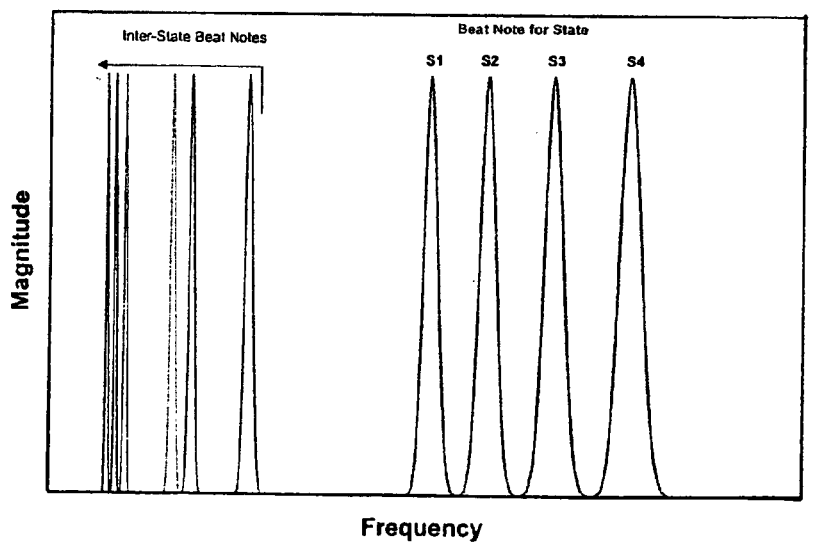
FIG. 3 illustrates schematically the frequency spectrum of the output signal from the interferometer showing beat frequency components associated with the four polarization states.

The principle of the method is analogous to frequency division multiplexing, which allows the simultaneous transmission of two or more channels by using different sub-carrier frequencies. It should be noted, that interference occurs as a result of light beams propagating through different paths internal to the PSFM. These interferences will also modulate the output of the Mach-Zehnder interferometer at spurious beat frequencies related to the various differences in optical path through the PSFM. It is important that these spurious beat frequencies do not have the same value of the beat frequencies associated with the four polarization states. In an embodiment of the invention, the differences in path length internal to PSFM are selected such that the beat frequencies for these spurious modulations lie as a group separate in frequency from the group of beat frequencies associated with the four polarization states (FIG. 3). Thus the electrical signal output from the photodetector can be filtered by electrical or digital means known in the art, to pass only those frequencies that are associated with the four polarization states.

Figure 2:
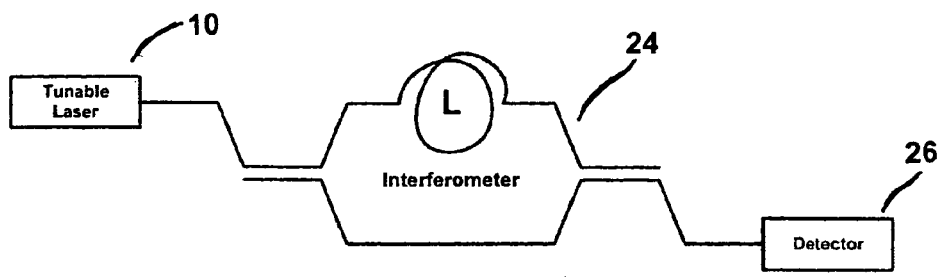
FIG. 2 is a schematic representation of a simplified arrangement exemplifying the principle of the invention.

Referring now to FIG. 2, the concept of the polarization state multiplexer can be illustrated by a simple configuration consisting of a tunable laser 10, a two-beam interferometer 24 and a detector 26. When the wavelength of the laser is scanned, interference maxima are detected in the receiver at a frequency (beat note) according to the formula:

$$f_{Intf} = S \times \frac{L \cdot n}{\lambda^2} \quad (1)$$

where S represents the sweep-rate of the laser, L is the path length difference between the signal and the reference arm, n is the refractive index of the medium along L, and λ is the laser wavelength. For a fixed laser sweep-rate and in a given wavelength interval, this frequency is a function of the path length difference L.

In accordance with the invention, the path lengths of the four arms in the PSFM are chosen such that four separable sub-frequencies can be detected in the photodetector. Each of these frequencies is associated with one of the four polarization states. FIG. 3 depicts the consequential frequency spectrum schematically (magnitudes not to scale). It is noted that sub-frequencies arising from the path length difference between the four arms themselves will also be present in the spectrum. These parasitic or spurious frequencies can simply be separated from the frequencies associated with the four polarization states by choosing the maximum path length difference between the arms $L_1$, $L_2$, $L_3$ and $L_4$ to be shorter than differences between $L_1$, $L_2$, $L_3$ and $L_4$ and the reference arm length thereby permitting the spurious beat frequencies to be separated from the desired beat frequencies by filtering. A preferred embodiment is to select $L_1$, $L_2$, $L_3$ and $L_4$ such that the difference $L_2$ and $L_1$ is the same as that between $L_3$ and $L_2$ and between $L_4$ and $L_3$. In FIG. 3, the amplitude of the all the frequency components in the signal output is shown as being the same, but it is noted that the contributions to the spectrum from interference of orthogonal polarization states are expected to be negligible. For example, in the spurious inter-state beat notes, the magnitude of the interference between the vertical polarized state and the horizontal polarized state is negligible The de-multiplexing (separation) of the four states can be accomplished e.g. by applying a Fast Fourier Transform (FFT) algorithm to the digitized measured signal. Applying an appropriate frequency window can filter each of the four polarization states from the frequency spectrum. After back-transformation of each of the four separated states the DUT's PDL and DGD can be calculated by invoking the algorithms mentioned above.

Figure 4:
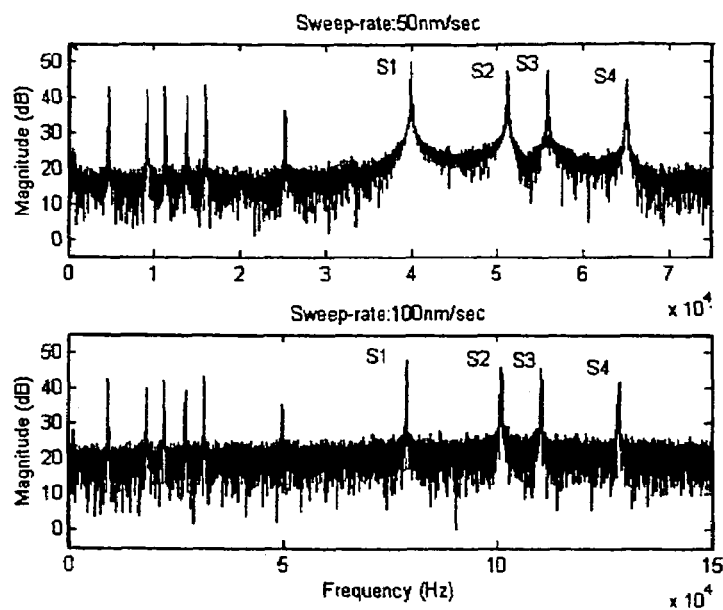
FIG. 4 shows measured frequency spectra of the output signal from the interferometer two different laser sweep rates.

The viability of this method for polarization state frequency multiplexing is demonstrated in FIG. 4. The subplots show the spectral content for laser sweep-rates of 50 nm/sec and 100 nm/sec, respectively. These measurements were obtained by recording the waveform at a digitization rate of 2 MHz.

The observed frequency spectrum consists of 4 distinct frequencies, associated with the 4 polarization states (S1 to S4) and their corresponding spurious frequencies in the lower frequency regime.

One of the embodiments of the invention employing the PSFM is described below in conjunction with FIG. 5 which depicts a configuration for the multiplexing of four polarization states with linear horizontal, linear vertical, linear diagonal and right-hand circular orientation as required in the previously outlined measurement scheme for PDL and DGD. This embodiment uses a lens, polarization optics and free space propagation illustrating that the invention is not limited to guided wave light propagation.

The incoming beam from a waveguide is widened by a lens element 30 and then split into four sub-beams by a set of mirror elements 32. Each of the four sub-beams is guided into a sub-beam specific delay element 34 and polarization element 36. The four sub-beams are re-combined by a set of mirror elements 38 and guided to a lens element 40 used to couple the beam into a waveguide at the output of the PSFM.

Figure 5:
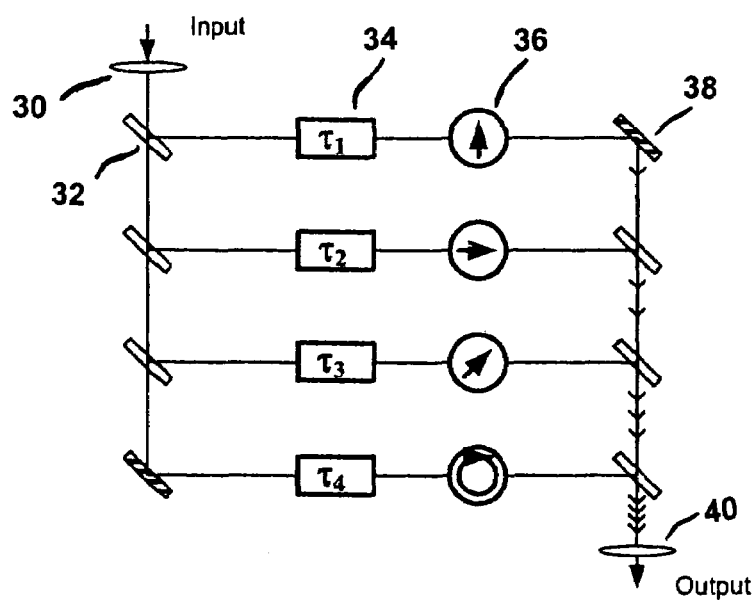
FIG. 5 represents a basic configuration of a polarization state frequency multiplexer of the invention.

It is noted that from the concept of frequency multiplexing of polarization states used in this basic configuration of FIG. 5, a number of embodiments can be envisioned. For example, splitting off additional sub-beams in the PSFM can be used to multiplex a larger number of arbitrary polarization states. In addition, by using a variable polarization state controller in each of the sub-beams, any polarization state can be multiplexed.

Another embodiment of a PSFM can be realized by an arrangement of polarization beam splitting surfaces and prisms used e.g. in a polarimeter according to U.S. Pat. No. 6,043,887 (L. Allard), the disclosure of which is hereby incorporated by reference. In the function as a PSFM, the device of the Allard patent could be operated in "reverse mode" such that different polarizations are combined and then coupled into the waveguide.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. An optical multiplexing apparatus comprising:
   a tunable light source for providing a light beam, the beam having a wavelength that varies periodically through a range of wavelengths at a sweep frequency rate,
   a first splitting means for splitting the light beam into a signal beam and a reference beam,
   a second splitting means for splitting the signal beam into at least four sub-beams;
   means for imparting a distinctly different polarization state to each of the sub-beams in order to associate each of the sub-beams with a different polarization state,
   means for recombining the sub-beams with different polarization states into a single optical beam;
   means for interfering the single optical beam with the reference beam in order to obtain an output light signal, having an amplitude which varies in time; and
   means for detecting the output light signal and resolving the output signal into frequency components thereof;
   wherein the time delay for each the sub-beam is selected such that a unique frequency component of the output light signal is associated with each one of the different polarization states; and
   wherein the at least four sub-beams comprise four sub-beams with four different polarization states comprising linear horizontal, linear diagonal, linear vertical, and right-hand circular.

2. The apparatus of claim 1, wherein the interfering means comprises an interferometer selected from the group consisting of a Mach Zehnder interferometer, a Tyman Green interferometer, a Michelson interferometer, and a Fabry-Perot interferometer.

3. The apparatus of claim 1, further comprising a device under test, wherein the single optical beam is optically coupled to the device under test and the output of the device under test is optically coupled to the interfering means.

4. A method for measuring optical properties of an optical device, comprising the steps of:
   (a) providing a light beam of varying frequency from a frequency-tunable light source,
   (b) splitting the light beam into a first light beam and a reference light beam,
   (c) splitting the first light beam into at least four sub-beams,
   (d) imparting a different time delay to each of the sub-beams,
   (e) imparting a different polarization state to each of the sub-beams,
   (f) recombining the sub-beams into a single combined light beam containing the supersposition of the polarization states,
   (g) passing the single combined light beam through a device under test to produce a transmitted light beam,
   (h) imparting a path length difference between the single combined light beam and the reference light beam,
   (i) combining the transmitted light beam and the reference light beam to cause interference therebetween and to produce an output beam containing modulations at beat frequencies associated with the different polarization states, and
   (j) determining and displaying a measure of at least one of polarization dependent loss (PDL) and polarization mode dispersion (PMD) by analyzing signal levels of the beat frequencies of the output beam.

5. An apparatus for measuring optical properties of an optical device, the apparatus comprising
   a frequency-tunable light source,
   a beam splitter coupled to receive a light beam from the source and to split the light beam into a signal beam and a reference beam,
   an interferometer having at least a first and a second optical paths having different path length, coupled to pass the signal beam through the first path and the reference beam through the second path,
   a second beam splitter disposed in the first path to split the signal beam into at least four sub-beams;
   means for imparting a different time delay to each of the sub-beams,
   means for imparting a distinctly different polarization state to each of the sub-beams,
   means for recombining the sub-beams with different polarization states into one recombined optical beam to be passed through the optical device and to be interfered with the reference beam in the interferometer to form an interfered beam containing modulations at beat frequencies associated with the different polarization states, and
   means for analyzing the interfered beam in the frequency domain to obtain signal levels of the beat frequencies at the different polarization states from which polarization mode dispersion (PMD) or polarization dependent loss (PDL) is calculated 6. The apparatus according to claim 5, wherein the at least four sub-beams comprise four sub-beams with four different polarization states comprising linear horizontal, linear diagonal, linear vertical, and right-hand circular.

7. The apparatus of claim 3, further comprising an analyzer for calculating polarization mode dispersion (PMD) or polarization dependent loss (PDL) of the device under test based on amplitudes of the frequency components of the output light signal associated with each one of the different polarization states.

8. The method according to claim 5, wherein the at least four sub-beams comprise four sub-beams with four different polarization states comprising linear horizontal, linear diagonal, linear vertical, and right-hand circular.

9. The method according to claim 4, further comprising filtering spurious beat frequencies separate from the beat frequencies associated with the different polarization states.

10. A device for determining optical properties of a device under test comprising:
    a tunable light source for providing a light beam, the beam having a wavelength that varies periodically through a range of wavelengths at a sweep frequency rate;
    a first beam splitter for splitting the light beam into a signal beam and a reference beam,
    a second beam splitter having one input and at least four outputs for splitting the signal beam into at least four sub-beams;
    at least four polarizing optics for imparting a distinctly different polarization state to each of the sub-beams in order to associate each of the sub-beams with a different polarization state;
    a beam combiner having at least four inputs and one output for combining the sub-beams into a single optical beam for input to the device under test;
    an interferometer for interfering the single optical beam with the reference beam to obtain
    an output light signal, having an amplitude which varies in time; and a detector for detecting the output light signal and resolving the output light signal into frequency components thereof, and for calculating polarization mode dispersion (PMD) or polarization dependent loss (PDL) of the device under test based on amplitudes of the frequency components associated with the different polarization states;

wherein the time delay for each the sub-beams is selected such that a unique frequency component of the output light signal is associated with each one of the different polarization states.

11. The apparatus according to claim 10, wherein the at least four sub-beams comprise four sub-beams with four different polarization states comprising linear horizontal, linear diagonal, linear vertical, and right-hand circular.

12. The apparatus according to claim 10, further comprising a filter for filtering spurious frequencies separate from the frequencies associated with the different polarization states.

* * * * *